United States Patent
Khatravath et al.

(10) Patent No.: US 10,332,031 B2
(45) Date of Patent: Jun. 25, 2019

(54) METHOD AND SYSTEM FOR RECOMMENDING ONE OR MORE EVENTS BASED ON MOOD OF A PERSON

(71) Applicant: Wipro Limited, Bangalore (IN)

(72) Inventors: Sreevidya Khatravath, Hyderabad (IN); Sumanta Laha, Begampur (IN); Nick Isaacs, Kochi (IN)

(73) Assignee: Wipro Limited, Bangalore (IN)

(*) Notice: Subject to any disclaimer, the term of this patent is extended or adjusted under 35 U.S.C. 154(b) by 637 days.

(21) Appl. No.: 15/070,635

(22) Filed: Mar. 15, 2016

(65) Prior Publication Data

US 2017/0255689 A1 Sep. 7, 2017

(30) Foreign Application Priority Data

Mar. 1, 2016 (IN) .............................. 201641007227

(51) Int. Cl.
| | |
|---|---|
| *G06N 20/00* | (2019.01) |
| *H04L 29/08* | (2006.01) |
| *G06F 16/28* | (2019.01) |
| *G06F 16/2457* | (2019.01) |

(52) U.S. Cl.
CPC ....... *G06N 20/00* (2019.01); *G06F 16/24578* (2019.01); *G06F 16/285* (2019.01); *H04L 67/306* (2013.01)

(58) Field of Classification Search
CPC ...................... G06F 17/30598; G06F 17/3053
See application file for complete search history.

(56) References Cited

U.S. PATENT DOCUMENTS

| | | | | |
|---|---|---|---|---|
| 7,725,842 | B2* | 5/2010 | Bronkema | G06F 19/3481 715/866 |
| 8,617,067 | B2* | 12/2013 | Jain | A61B 5/4848 600/300 |
| 8,622,899 | B2 | 1/2014 | Jain et al. | |
| 2006/0147884 | A1 | 7/2006 | Durrell | |
| 2007/0238934 | A1 | 10/2007 | Viswanathan | |
| 2009/0002178 | A1 | 1/2009 | Guday et al. | |

(Continued)

FOREIGN PATENT DOCUMENTS

| | | |
|---|---|---|
| WO | WO 01/39097 | 5/2001 |
| WO | WO 2015/067534 | 5/2015 |

*Primary Examiner* — Vincent Gonzales
*Assistant Examiner* — Seth Andrew Raker
(74) *Attorney, Agent, or Firm* — Finnegan, Henderson, Farabow, Garrett & Dunner, LLP

(57) ABSTRACT

Disclosed herein is a method and system for recommending one or more events based on mood of a person. The method comprises receiving activity data associated with one or more activities of the person and personal information of the person from data sources. The received activity data is classified into one or more predefined categories. An event profile of the person is generated based on the classified activity data. Thereafter, a sensitivity score of the person is determined based on impact of a current event on the person, activity score of the person and correlation of the current event with one or more events occurred simultaneously with the current event. Further, a mood score of the person is determined based on the sensitivity score and the event profile of the person. Furthermore, events are recommended to the person based on the sensitivity score and the mood score of the person.

19 Claims, 4 Drawing Sheets

(56) References Cited

U.S. PATENT DOCUMENTS

2014/0136450 A1    5/2014  Lee
2014/0350349 A1*  11/2014  Geurts ................ A61B 5/0022
                                                                     600/300
2015/0086949 A1    3/2015  Li et al.

* cited by examiner

METHOD AND SYSTEM FOR RECOMMENDING ONE OR MORE EVENTS BASED ON MOOD OF A PERSON

TECHNICAL FIELD

The present subject matter is related, in general to mood analysis, and more particularly, but not exclusively to a method and system for recommending one or more events based on the mood of a person.

BACKGROUND

Mood is a temporary state of mind or emotion of a person. Mood is an internal, subjective state but it often can be inferred from posture and other behaviors of the person. Typically, mood of a person is described as having either a positive or negative impact on the person. Positive mood of a person helps the person in maintaining a healthy emotional balance and allows the person's thoughts, intellectual potential, intuition and awareness to flow more freely. Similarly, negative moods too have significant implications for the person's mental and physical wellbeing. Negative moods can manipulate how the person interprets and translates the world around him/her, and can also affect the person's judgment and perception of objects and events.

Long term disturbances of mood such as, "Clinical depression" and "Bipolar disorder" are considered as mood disorders. Treatment of these mood disorders requires a lot of information about the person, including the most likely events/reasons which have caused the disorder in mood of the person. Mood disorders can be effectively cured if the method of treatment is based on the results of analysis of the events/reasons causing the disorder.

Conventional methods of treating the mood disorders comprise diagnosis by physicians through consultation and use of questions, questionnaires and checklists. While useful, such approaches generally rely on verbal expression of the affected person. This can be problematic as the person may not be able to clearly express his/her thoughts and feelings in words. This is particularly the case for children, the special aided persons, and sufferers of dyslexia and autism.

Other conventional methods of treating the mood disorders include software/mobile applications that are based out of questionnaire for predicting the mood of the person. However, the software/mobile applications like Gratitude Journal, Headspace and Mood kit require manual intervention from the person to improve and/or change the mood of the person. Yet other conventional methods use techniques such as image processing, text processing and sentiment analysis for intelligent tracking of the person's mood. However, use of such techniques doesn't understand the true sensitivity of the person towards the events/reasons causing the mood disorder. Hence, there is a need for a method of automatic analysis of the mood of the person and to recommend one or more events to the person for improving the mood of the person.

The challenges mainly faced in recommending one or more events based on the mood of the person include real-time analysis of the mood of the person, determining the person's sensitivity towards one or more events and recommending one or more events to the person based on one or more interests of the person.

SUMMARY

Disclosed herein is a method and system for recommending one or more events based on mood of a person. Response of a person towards one or more events is analyzed to determine sensitivity and mood factors associated with the person. One or more events are recommended to the person when the sensitivity factor and the mood factor associated with the person are low, thereby improving the mood of the person without the intervention of the person.

Accordingly, the present disclosure relates to a method for recommending one or more events based on mood of a person. The method comprises receiving, by an event recommendation system, activity data associated with one or more activities of the person and personal information of the person from one or more data sources. The method classifies the received activity data into one or more predefined categories. An event profile of the person is generated based on the classified activity data. Thereafter, a sensitivity score of the person is determined based on impact of a current event on the person, activity score of the person and correlation of the current event with one or more events occurred simultaneously with the current event. Further, a mood score of the person is determined based on the sensitivity score and the event profile of the person. Furthermore, one or more events are recommended to the person based on the sensitivity score and the mood score of the person.

Further, the present disclosure relates to an event recommendation system for recommending one or more events based on mood of a person. The event recommendation system comprises a processor and a memory communicatively coupled to the processor. The memory stores processor-executable instructions, which, on execution, cause the processor to receive activity data associated with one or more activities of the person and personal information of the person from one or more data sources. The received activity data are classified into one or more predefined categories. The event recommendation system generates an event profile of the person based on the classified activity data. Thereafter, the event recommendation system determines a sensitivity score of the person based on impact of a current event on the person, activity score of the person and correlation of the current event with one or more events occurred simultaneously with the current event. Further, a mood score of the person is determined based on the sensitivity score and the event profile of the person. Furthermore, the event recommendation system recommends one or more events to the person based on the sensitivity score and the mood score of the person.

Furthermore, the present disclosure relates to a non-transitory computer readable medium including instructions stored thereon that when processed by at least one processor cause an event recommendation system to perform operations comprising receiving activity data associated with one or more activities of the person and personal information of the person from one or more data sources. The instructions cause the processor to classify the activity data into one or more predefined categories. An event profile of the person is generated based on the classified activity data. Thereafter, the instructions cause the processor to determine a sensitivity score of the person based on impact of a current event on the person, activity score of the person and correlation of the current event with one or more events occurred simultaneously with the current event. Further, the instructions cause the processor to determine a mood score of the person based on the sensitivity score and the event profile of the person. Furthermore, the instructions cause the event recommendation system to recommend one or more events to the person based on the sensitivity score and the mood score of the person.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
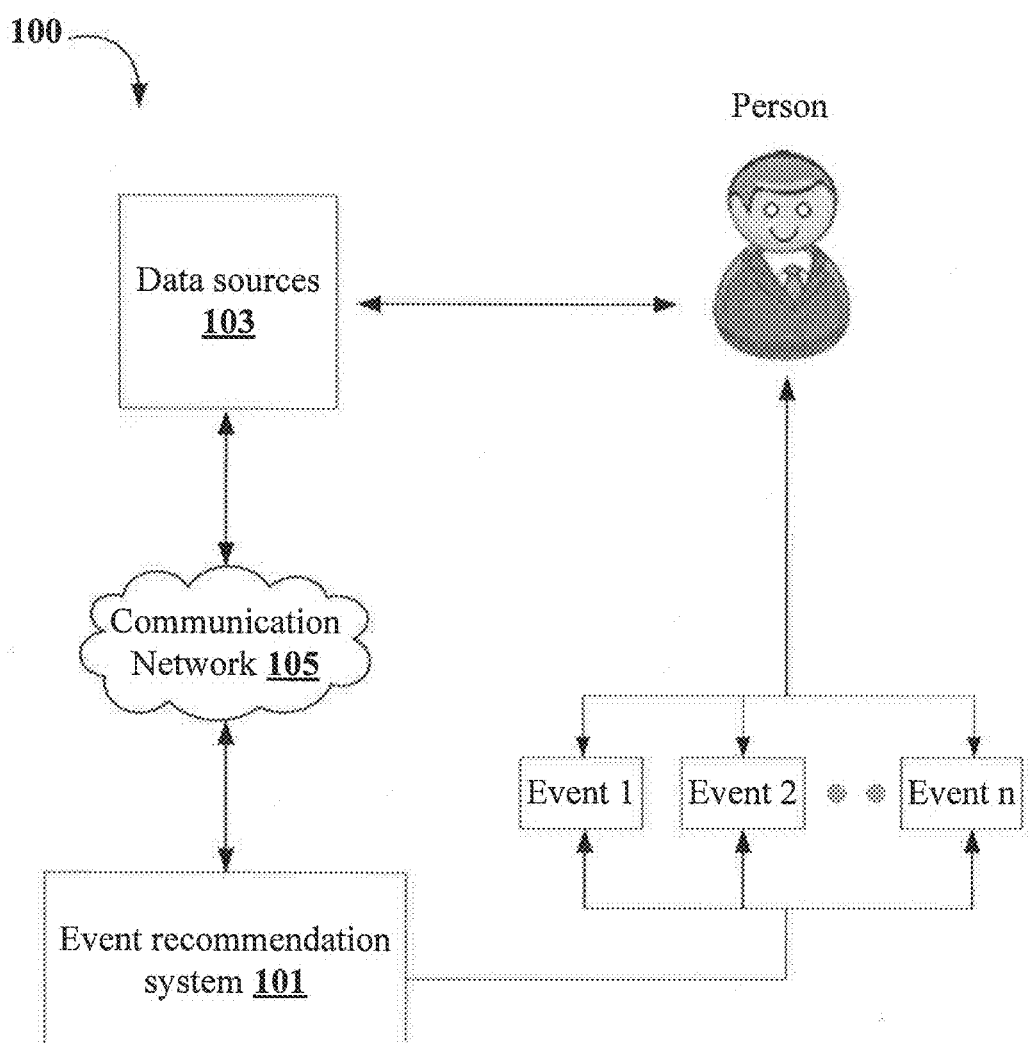
FIG. 1 shows an exemplary environment illustrating a method for recommending one or more events based on mood of a person in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for recommending one or more events based on mood of a person. The method comprises receiving, by an event recommendation system, activity data associated with one or more activities of the person and personal information of the person from one or more data sources. The method classifies the received activity data into one or more predefined categories. An event profile of the person is generated based on the classified activity data. Thereafter, a sensitivity score of the person is determined based on impact of a current event on the person, activity score of the person and correlation of the current event with one or more events occurred simultaneously with the current event. Further, a mood score of the person is determined based on the sensitivity score and the event profile of the person. Furthermore, one or more events are recommended to the person based on the sensitivity score and the mood score of the person.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating a method for recommending one or more events based on mood of a person in accordance with some embodiments of the present disclosure.

The environment 100 comprises an event recommendation system 101 for recommending one or more events to a person based on mood of the person. The event recommendation system 101 collects one or more activity data 203 related to the one or more activities performed by the person from one or more data sources 103 associated with the person through a communication network 105. In an embodiment, the one or more data sources 103 may be online and/or offline sources. The online data sources 103 may include, without limitation, social media activities of the person and web browsers used by the person. Similarly, the offline data sources 103 may include, without limitation, medical records of the person and one or more activities of the person recorded on a Closed-Circuit Television (CCTV). The communication network 105 may include, but not limited to, a wired communication network, a wireless communication network and a suitable combination thereof.

In an embodiment, the event recommendation system 101 classifies the one or more activity data 203 received from the one or more data sources 103 into one or more categories of activity data 203. As an example, the one or more activity data 203 may be classified into one or more categories such as, a health category having one or more health information of the person, a personal information category having one or more personal information and interests of the person, and other categories having one or more information of the one or more other persons related to the person. An event profile 205 of the person may be generated based on the one or more received activity data 203. As an example, the event profile 205 of the person may include personal information of the person, one or more interests of the person, impact of the one or more events on the person, reaction of the person towards the impact of the one or more events and information about the one or more persons related to the person. Further, the event recommendation system 101 determines a sensitivity score 211 and a mood score 213 of the person based on the event profile 205 of the person. Sensitivity score 211 of the person is a degree to which the person reacts to an event. The mood score 213 of the person is the degree of emotion of the person towards the event. The mood score 213 of the person may be generated based on the sensitivity score 213 and event profile 205 of the person. Finally, the event recommendation system 101 recommends one or more events to the person based on the sensitivity score 211 and the mood score 213 of the person for improving the mood of the person. The method of generating the sensitivity score 211, mood score 213 and the method of recommending the one or more events to the person are explained briefly in the below sections.

Figure 2:
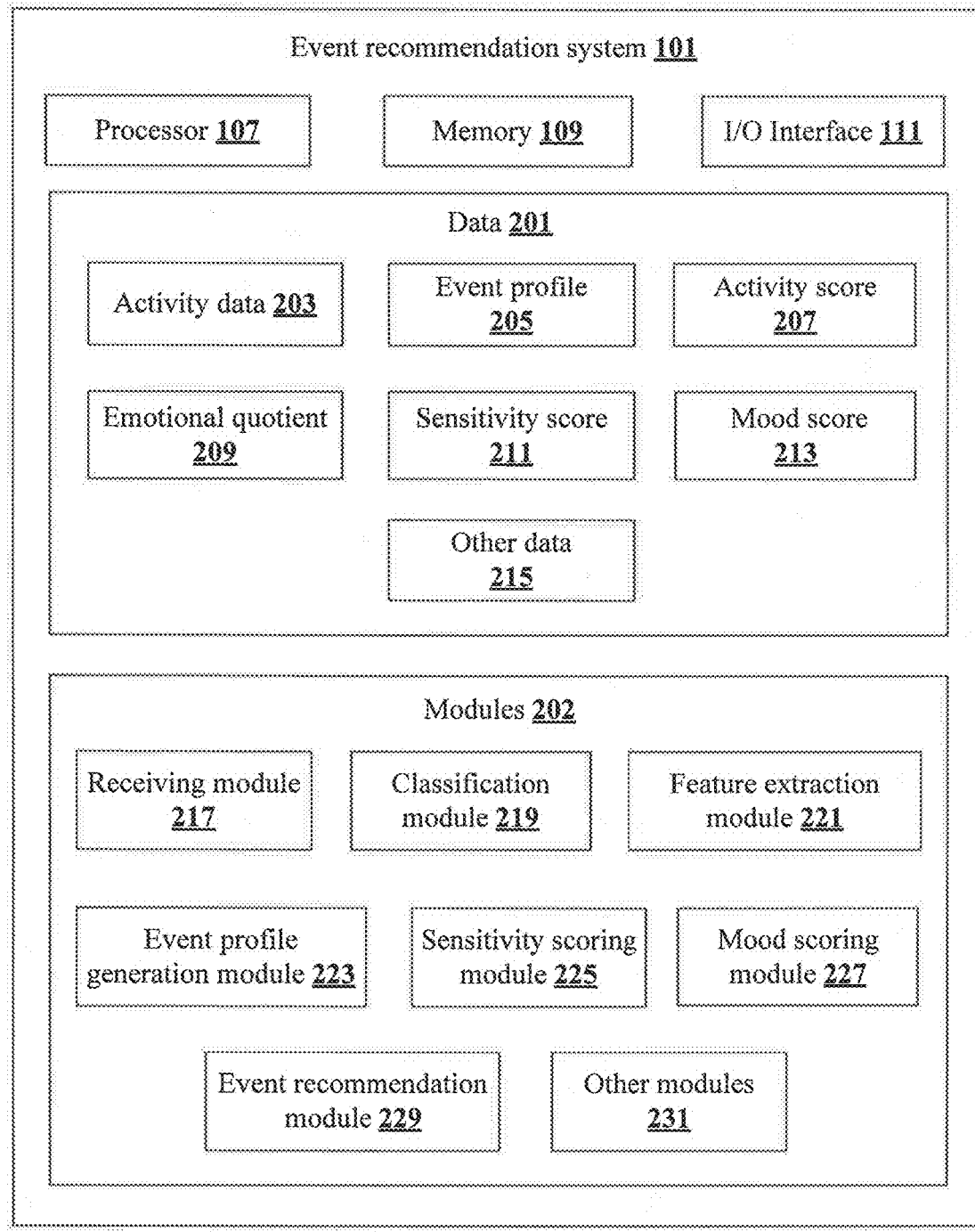
FIG. 2 shows a detailed block diagram illustrating an event recommendation system in accordance with some embodiments of the present disclosure.

FIG. 2 shows a detailed block diagram illustrating an event recommendation system in accordance with some embodiments of the present disclosure.

The event recommendation system 101 comprises a processor 107, a memory 109 and an I/O interface 111. The I/O interface 111 is configured to receive one or more activity data 203 from the one or more data sources 103 via the communication network 105. The memory 109 is communicatively coupled to the processor 107. The processor 107 is configured to perform one or more functions of the event recommendation system 101 for recommending one or more events to the person based on the mood of the person. In one implementation, the event recommendation system 101 comprises data 201 and modules 202 for performing various operations in accordance with the embodiments of the present disclosure. In an embodiment, the data 201 may include, without limiting to, one or more activity data 203, event profile 205 of the person, activity score 207 of the person, emotional quotient 209 of the person, sensitivity score 211, mood score 213 and other data 215.

In one embodiment, the data 201 may be stored in the memory 109 in the form of various data structures. Additionally, the aforementioned data 201 can be organized using data models, such as relational or hierarchical data models. The other data 215 may store data, including temporary data and temporary files, generated by modules 202 for performing the various functions of the event recommendation system 101.

In an embodiment, the one or more activity data 203 are the data related to the one or more activities performed by the person. The one or more activity data 203 may be received from the one or more data sources 103 associated with the person. The activity data 203 may include social media data of the person, such as, status updates, comments/likes/up-votes/shares on the posts on the social media, etc. The social media data reflects on state of mind of the person along with current views of the person. Online browsing patterns of the user, collected from the one or more web browsers used by the person, indicate one or more events for which the person is concerned. As an example, the browsing patterns of the person may indicate if the person is seeking help online. The one or more activity data 203 may also include medical records of the person which may be collected from hospitals that the person visits regularly. The medical records may provide insight into the person's emotional and physical state of health. The activity data 203 may further include one or more CCTV footages which are captured by the one or more CCTVs configured in the surroundings of the person. The one or more CCTV footages may be observed and analyzed to identify the person's physical movements and/or activities, such as, outbursts of anger, depressive actions etc. to understand the person's current state of mind. In an implementation, the one or more captured CCTV footages may be analyzed using one or more video investigation techniques such as, for identifying the person's current activities and current state of mind.

In an embodiment, the event profile 205 of the person may include one or more personal information of the person. The one or more personal information of the person may include name of the person, age, gender and geographical location of the person. The event profile 205 may also include, without limiting to, one or more interests of the person, impact of the one or more events on the person, reaction of the person towards the impact of the one or more events and information about the one or more persons related to the person. In an embodiment, the event profile 205 of the person may be used for determining the mood score 213 of the person.

In an embodiment, the activity score 207 of the person may be generated from the various activities performed by the person. The one or more data related to each of the one or more activities performed by the person are collected from one or more online and offline data sources 103. The activity score 207 of the person may be determined by considering a measure of the current mood and/or state of mind of the person. As an example, if the person is more active during night time of the day, the activity score 207 of the person would be higher at night time of the day. In an embodiment, the person may be considered to be more active when the captured one or more CCTV footages of the person show one or more activities performed by the person. A higher activity score 207 at night means that, the person is more equipped to handle situations and/or events at night rather than in the day time. In an embodiment, the activity score 207 may be an integer value on a scale of 0 to 5, showing the activity of the person at one or more predefined intervals of the day. As an example, the activity score 207 of the person may be "5" at night time of the day if the person is more active during night time of the day.

In an embodiment, the emotional quotient 209 of the person is determined by monitoring behaviour of the person towards the one or more events occurred previously. The behaviour of the person may be monitored by testing the person with one or more test events and analyzing the reactions of the person towards the one or more test events. For example, if a person doesn't mind his/her surroundings and keeps himself/herself busy with his/her own concerns may not feel anything for other person's personal issues and problems. Hence, the emotional quotient 209 associated with the person, in such a case, would be low. In an embodiment, the emotional quotient 209 of the person may be an integer value from 0 to 5. A person's emotional quotient 209 may be "5" when the person is highly emotional.

In an embodiment, the sensitivity score 211 of the person may be determined based on impact of a current event on the person, activity score 207 of the person and correlation of the current event with the one or more other events occurred simultaneously with the current event. In other words, the sensitivity score 211 of the person is a function of the impact of an event (or Event impact) on the person, activity score 207 of the person and the correlation among the events as shown in the below equation (1):

Sensitivity score=$f$(Event impact,Activity score,Correlation among events) (1)

The event impact of the current event on the person may be calculated by measuring relevance of the event to the person and by determining whether the event would have a positive or negative impact on the person. The event impact may depend on the age of the person, the emotional quotient 209 of the person and the nature of the event, as shown in the below equation (1).

$$\text{Event impact} = f(\text{Age of the person, Emotional quotient, Nature of event}) \quad (2)$$

In an embodiment, the nature of the event may be one of internal or external. Internal events are the events which may directly affect the person for example, mental and/or physical wellness of the person, health issues of the person, professional and/or work based pressure on the person etc. External events are the events which are not directly related to the person, such as, natural disasters, terrorist activities and the similar. In an embodiment, the one or more internal events and the one or more external events may be assigned an integer value of "1" and "0.5" respectively, during the calculation of the event impact for the person.

In an embodiment, the correlation among the one or more events happening at the same time may be used for determining the sensitivity score 211 of the person with respect to the current event. As an example, the two events happening at the same time may be "the person getting promoted" and at the same time "an earth quake happening at the person's home town". As an individual, the person may be more sensitive towards the event related to promotion. Hence, the sensitivity score 211 of the person for the event related to promotion may be high. In an embodiment, the correlation between the one or more events may be indicated by a correlation factor, which has a value "1" or "−1" depending on the number of correlating events occurred in the day. As an example, the correlation factor may be "1" when no other events have occurred that day. Similarly, the correlation factor may be "−1" when one or more other events have occurred that day and are impacting the person.

In an embodiment, the mood score 213 of the person may be determined based on the sensitivity score 211 of the person and the event profile 205 of the person as shown in the below equation (3):

$$\text{Mood score} = f(\text{Sensitivity score, Event profile}) \quad (3)$$

The event profile may 205 comprise one or more details on personality, identity, psychological behaviour and interests of the person. The event profile 205 may be used to determine the person's probable reaction towards the current event. As an example, the person who is very sensitive to events such as violence may get impacted with a newspaper headline on the violence. Such a person may easily become cheerful on seeing happy news related to some of his interests. In an embodiment, the event profile 205 may also indicate the interest of the person towards a particular event by assigning an integer value to the event on a scale of 0 to 5. As an example, the event profile 205 may indicate an integer value of "5" for an event of "book reading" if the person is really interested in the "book reading" event.

In an embodiment, the data may be processed by one or more modules 202 of the event recommendation system 101. Alternatively, the one or more modules 202 may also be stored within the memory 109. In an example, the one or more modules 202 may be communicatively coupled to the processor 107 for performing one or more functions of the event recommendation system 101.

In one implementation, the one or more modules 202 may include, without limitation, a receiving module 217, a classification module 219, a feature extraction module 221, an event profile generation module 223, a sensitivity scoring module 225, a mood scoring module 227, an event recommendation module 229 and other modules 231. The other modules 231 may be used to perform various miscellaneous functionalities of the event recommendation system 101. It will be appreciated that such aforementioned modules 202 may be represented as a single module or a combination of different modules.

In an embodiment, the receiving module 217 may be configured to receive one or more activity data 203 from the one or more data sources 103 through the communication network 105. The one or more activity data 203 received from the one or more data sources 103 may include the information on the social media activities of the person, one or more personal information of the person, one or more interests of the person and details of one or more persons related to the person. The one or more activity data 203 received from the one or more data sources 103 may be classified into the one or more predefined categories using the classification module 219 for determining the sensitivity score 211 and the mood score 213 of the person.

In an embodiment, the receiving module 217 may also prompt the person to provide one or more critical details such as medical reports and health information when the user has not provided the one or more critical details.

In an embodiment, the receiving module 217 may also receive one or more details from household and/or personal devices of the person, such as, fitness devices/trackers used by the person for determining one or more activities performed by the person. As an example, the one or more details received from the household/personal devices of the person may help the event recommendation system 101 to understand sleeping patterns of the person, food and water intake patterns of the person and physical workout patterns and calories burnt by the person. In an embodiment, one or more information which are not required by the event recommendation system 101 may be discarded and only relevant and/or specific abnormal patterns of the person are collected by the receiving module 217.

In an embodiment, the classification module 219 classifies the one or more activity data 203 into one or more predefined categories. The activity data 203 may be classified based on one or more interests of the person, health information of the person and information about the one or more persons related to the person. As an example, the one or more activity data 203 may be classified into one or more categories such as interests, exercise schedule, health/medical and other categories comprising one or more information on friends, close friends, family member and relatives. In an embodiment, the one or more activity data 203 may also be classified into one or more dynamically formed categories. The one or more categories may be dynamically formed using unsupervised learning techniques.

In an embodiment, the classification module 219 may convert the one or more activity data 203 in various file formats into similar file formats before classifying the one or more activity data 203 into the one or more predefined categories. As an example, the one or more activity data 203 having an audio file type may have various file formats such as 'mp3', 'wav', 'aif', 'raw' and etc., which may be converted into a base audio file format of 'mp3'. Similarly, the medical records and readings of health monitoring devices used by the person may be converted into a common text file format such as 'txt'. Converting the one or more activity data 203 into the similar file types may reduce total time taken by the classification module 219 in extracting and classifying the one or more activity data 203.

In an embodiment, the feature extraction module 221 may be configured for extracting specific and/or required information from the one or more activity data 203 received by the receiving module 217. The feature extraction module 221 may be used for performing dimensionality reduction of the one or more activity data 203. Reducing the dimension of the one or more activity data 203 may be helpful in improving the accuracy of the scores assigned to the one or more activity data 203 and also helps in improving the performance of feature extraction module 221 on very high-dimensional activity datasets. As an example, consider one or more activity data 203 which are related to one or more events of the person's daily life. The feature extraction module 221 may extract one or more specific features like, total distance that the person has walked, total number of hours that the person has slept, the person's travel routine etc. from the one or more activity data 203. The one or more specific features, extracted from the one or more activity data 203 may be further used for generating the event profile 205 of the person.

In an embodiment, the feature extraction module 221 may also assign one or more metadata to the one or more activity data 203 for enabling easy classification of the one or more received activity data 203. The metadata may include, without limiting to, activity IDs etc. details to form one or more subsets or groups of the one or more activity data 203. Further, the feature extraction module 221 may use one or more feature extraction techniques such as, Univariate feature selection, Recursive feature elimination and Randomized sparse models depending on the nature of the one or more activity data 203 received by the receiving module 217. Further, the feature extraction module 221 may use a "DeepLearning" algorithm like Convolutional neural network, for processing the one or more activity data 203 of image/video file types in order to extract specific patterns and Multilayer Perceptron (MLP) in the image/video types. MLPs are feed forward artificial neural network models that map sets of input activity data 203 onto a set of appropriate activity data 203 group.

In an embodiment, the event profile generation module 223 generates the event profile 205 of the person based on the one or more activity data 203 in the one or more predefined categories. The event profile 205 of the person may include one or more personal information of the person, one or more interests of the person and impact of the one or more events on the person, reaction of the person towards the impact of the one or more events and information about the one or more persons related to the person.

In an embodiment, the event profile generation module 223 may be dynamically linked with the feature extraction module 221. The feature extraction module 221 accumulates the impact of the one or more events on the person and determines how the person reacts on the one or more accumulated events. The event profile generation module 223 receives the accumulated result from the feature extraction module for generating the complete event profile 205 of the person. As an example, if there is an event of the person watching news, the feature extraction module 221 captures how the person reacts on the specific news and how the current events like natural disaster will impact the person. This information may be further used by the event profile generation module 223 for dynamically updating the event profile 205 of the person based on the person's reaction to the one or more events in the news.

In another embodiment, the event profile generation module 223 may dynamically update the event profile 205 of the person with respect to a change in the current interest of the person due to happening of a particular event. Dynamically updating the event profile 205 of the person may eliminate the chances of recommending the one or more events to the person which are against the current interests of the person. As an example, the event profile 205 of the person, which has been generated based on the earlier interests of the person, may highlight a person 'P' as a close friend of the person. For instance, the person may encounter an argument with the person 'P', ending up in a heated discussion through messages/e-mails. In such a case, the event profile generation module 223 dynamically updates the event profile 205 of the person for reflecting the person 'P' away from the list of current friends/relatives of the person. Eventually, the event recommendation module 229 marks a low priority to an event of the person's future interactions with the person 'P', thereby avoiding further diminution of the person's mood.

In an embodiment, the sensitivity scoring module 225 determines the sensitivity score 211 of the person based on the impact of a current event on the person, activity score 207 of the person and correlation of the current event with the one or more events occurred simultaneously with the current event. As an example, consider a person who is a diehard fan of a sports team and the team happens to lose a final match of a tournament to their rival team. Assuming that the match has happened on the person's normal day of conduct and no other positive events have impacted the person at the same time, the sensitivity score 211 of the person for the event of the match may be very high. The event impact may also be higher if the person is in early twenties, since the event impact is a function of the age of the person as well. The event impact may be still higher if the activity score 207 of the person is higher at night time of the day and the match has happened at night. Accounting all the factors, the sensitivity score 211 of the person would be much higher and negative in this case.

In an embodiment, the mood scoring module 227 determines the mood score 213 of the person based on the sensitivity score 211 and the event profile 205 of the person. The method of determining the mood score 213 of the person may be well explained with the help of the below case scenarios.

Scenario 1:

Consider a person 'A' at an age of 50 years. Consider the person 'A' having a son who is currently working in an organization 'O'. For an instance, the person 'A' would be upset and/or highly impacted by an event of a disaster in the area 'X' where organization 'O' is present, since the person A's son is working in the organization 'O'. Here, the one or more events comprising one or more information on current status, well-being and location of his son would definitely elevate the person A's mood. Hence, the person 'A' would involve himself very actively in the morning and would complete most of his works by noon time of the day.

Now, the event impact of the person 'A' for the event of disaster at his son's organization may be determined by using the expression (2) explained in the above section.

i.e. Event impact $(A) = f(\text{Age}(A), \text{Emotional quotient }(A),$ $\text{Nature of the event})$ $= -(0.5 * 3 * 1)$ $= -1.5$ Similarly, the sensitivity score 211 of the person may be determined using the expression (1) explained in the above section.

i.e. Sensitivity score $(A) = f(\text{Event impact }(A), \text{Activity}$ $\text{score }(A), \text{Correlation factor})$ $= (-1.5 * 5 + 0)$ $= -7.5$ Also, the mood score 213 of the person may be determined by using the expression (3) explained in the earlier section.

i.e. Mood score $(A) = f(\text{Sensitivity impact }(A), \text{event profile }(A))$ $= (-7.5 * 5)$ $= -37.5$ Here, the mood score 213 of the person 'A' indicates that the mood of the person was highly affected by the event of disaster in the organization 'O'. Hence, the event recommendation system 101 recommends one or more events to the person 'A' which may improve the mood of the person 'A'. For example, in this scenario, the event recommendation system 101 may recommend a news event comprising one or more information on current status of the disaster at the location 'X' which, in turn, would provide information to the person 'A' about status of his son.

Scenario 2:

Consider a person 'B' at an age of 45 years living at a place 'Y' which is very far from the place 'X'. The person 'B' may not have any relatives, friends or any other connections with the place 'X'. Also, the event profile 205 of the person 'B' indicates that he is not very empathetic and doesn't react much to situations. Now, an event of a natural disaster that has happened at the place 'X' would not affect the person 'B' since the person 'B' is in no way related to the place 'X'. Also, the person's sensitivity score 211 for the event of the natural disaster would also be low. Assuming that the person 'B' is generally more active at night time of the day and not so active in the morning, and that he got a promotion at his workplace on the same day, the person's mood may be calculated in the following manner.

The event impact of the person 'B' due to the event of the natural disaster at the place 'X' and due to the event of promotion, both occurring on the same day, may be determined by using the expression (2) explained earlier.

i.e. Event impact $(B$ for the event of natural disaster$) =$ $f(\text{Age }(B), \text{Emotional quotient }(B),$ -continued $\text{Nature of the natural disaster event}) = -(0.45 * 1 * 0.5) = -0.225$ Similarly, Event impact $(B$ for the event of promotion$) =$ $f(\text{Age }(A), \text{Emotional quotient }(A), \text{Nature of the promotion event}) =$ $(0.45 * 5 * 1) = 2.25$ The sensitivity score 211 of the person with respect to the event of natural disaster at the place 'X' and the event of promotion may be determined using the expression (1) explained earlier.

i.e. Sensitivity score $(B$ for the event of natural disaster$) =$ $f(\text{Event impact }(B), \text{Activity score }(B),$ $\text{Correlation factor for the natural disaster event}) =$ $(-0.225 * 1 + (1 * 1)) = -0.775$ Similarly, Sensitivity score $(B$ for the event of promotion$) =$ $f(\text{Event impact }(B), \text{Activity score }(B), \text{Correlation factor}$ $\text{for the promotion event}) = (2.25 * 5 + (5 * 1)) = 16.25$ Also, the mood score 213 of the person 'B' for the event of natural disaster at the place 'X' and for the event of promotion would be a function of impact of each of the correlating events on the person 'B' and the sensitivity of the person 'B' towards both the correlating events.

i.e. Mood score $(B) =$

Event impact $(B$ for the event natural disaster$) +$ Event impact $(B$ for the event promotion$) = (-0.775 + 16.25) = 15.475$ Here, the mood score 213 of the person is positive and high, which means that the person 'B' is least impacted by the event of natural disaster and 'B' is very happy for the event of promotion. Hence, in this scenario, the event recommendation system 101 may not recommend any events to the person 'B' since the person 'B' is currently in a good mood.

In an embodiment, the event recommendation module 229 may recommend one or more events to the person based on the sensitivity score 211 and the mood score 213 of the person for improving the mood of the person. The event recommendation module 229 may showcase one or more news, reports, suggestions and events which may be opted for improving the present mood of the user. The event recommendation module 229 uses the sensitivity score 211 determined by the sensitivity scoring module 225 to identify the sensitivity of the person. Similarly, the event recommendation module 229 identifies the mood and the nature of the mood of the person using the mood score 213 of the person. As an example, the person may be considered to be in a good mood when the mood score 213 is positive and high. The person may be considered to be in a bad mood when the mood score 213 is negative and high.

In an embodiment, upon detecting that the person has a bad mood, the event recommendation module 229 checks the event profile 205 of the person to identify one or more extreme events which make the person happy irrespective of current state of mind of the person. For instance, suppose the person may be upset and the mood score 213 of the person are low and negative. Now, the event recommendation module 229 may suggest playing a soothing music to uplift the mood of the person since there are studies which prove that listening to the soothing music for a short time to would improve the person's negative mood.

In an embodiment, consider that the event profile 205 of the person shows that the person is a diehard fan of soccer and fond of action movies. For an instance, the person's mood might go down whenever he has witnessed his favourite soccer team losing a game. Now, the event recommendation module 229 may make use of the event profile 205 of the person to identify one or more further interests of the person in order to uplift the mood of the person. In this instance, the event recommendation module 229 may book a ticket for one of the action movies running in the surroundings of the person, thereby attempting to improve the mood of the person in real-time.

Figure 3:
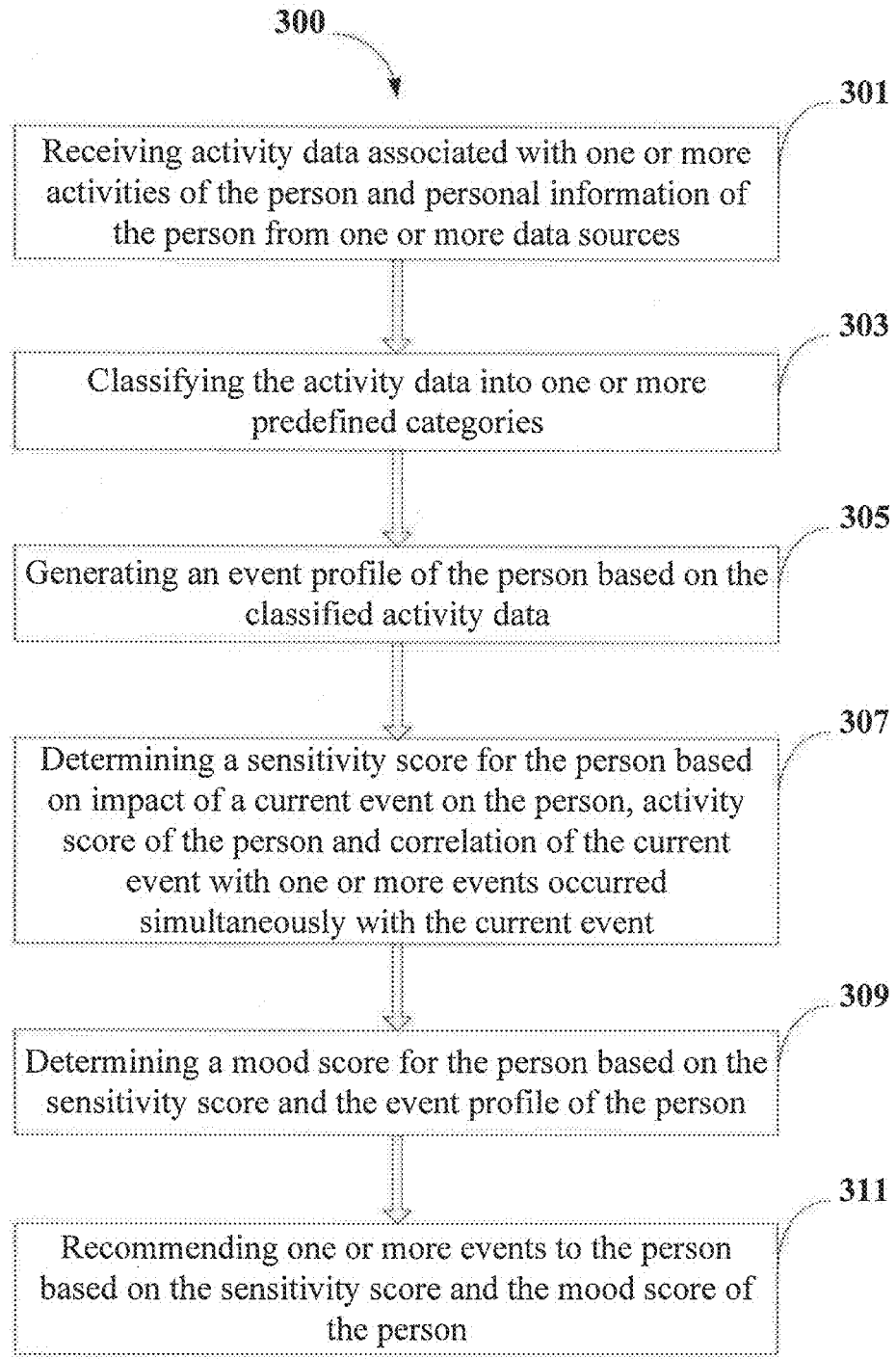
FIG. 3 illustrates a flowchart showing method for recommending one or more events based on mood of a person in accordance with some embodiments of the present disclosure.

FIG. 3 illustrates a flowchart showing method for recommending one or more events based on mood of a person in accordance with some embodiments of the present disclosure.

As illustrated in FIG. 3, the method 300 comprises one or more blocks for recommending one or more events based on mood of a person using an event recommendation system 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, an event recommendation system 101 receives activity data 203 associated with one or more activities of the person and personal information of the person from one or more data sources 103. The activity data 203 are the data related to the one or more activities performed by the person.

At block 303, the event recommendation system 101 classifies the activity data 203 into one or more predefined categories. The activity data 203 may be classified into one or more predefined categories based on at least one of one or more interests of the person, health information of the person and information about one or more persons related to the person over a predetermined period of time. In an embodiment, the one or more activity data 203 may also be classified into one or more dynamically formed categories. The one or more categories may be dynamically formed using unsupervised learning techniques.

At block 305, the event recommendation system 101 generates an event profile 205 of the person based on the classified activity data 203. The event profile 205 of the person includes one or more personal information of the person, information about the one or more persons related to the person, impact of the one or more events on the person, reaction of the person towards the impact of the one or more events and one or more interests of the person.

At block 307, the event recommendation system 101 determines a sensitivity score 211 for the person based on impact of a current event on the person, activity score 207 of the person and correlation of the current event with one or more events occurred simultaneously with the current event. The impact of the current event on the person is determined based on age of the person, relevance of the current event to the person and an emotional quotient 209 of the person. The emotional quotient 209 of the person is determined by monitoring behaviour of the person towards the one or more events occurred previously. The activity score 207 is identified based on active condition of the person at predefined time intervals.

At block 309, the event recommendation system 101 determines a mood score 213 for the person based on the sensitivity score 211 and the event profile 205 of the person. In an example, the mood score 213 of the person may be used to determine the current mood of the person. The current mood of the person may be considered to be bad/low when the mood score 213 of the person is negative.

At block 311, the event recommendation system 101 recommends one or more events to the person based on the sensitivity score 211 and the mood score 213 of the person. The one or more events are recommended to the person based on the one or more interests of the person stored in the event profile 205 of the person.

Computer System

Figure 4:
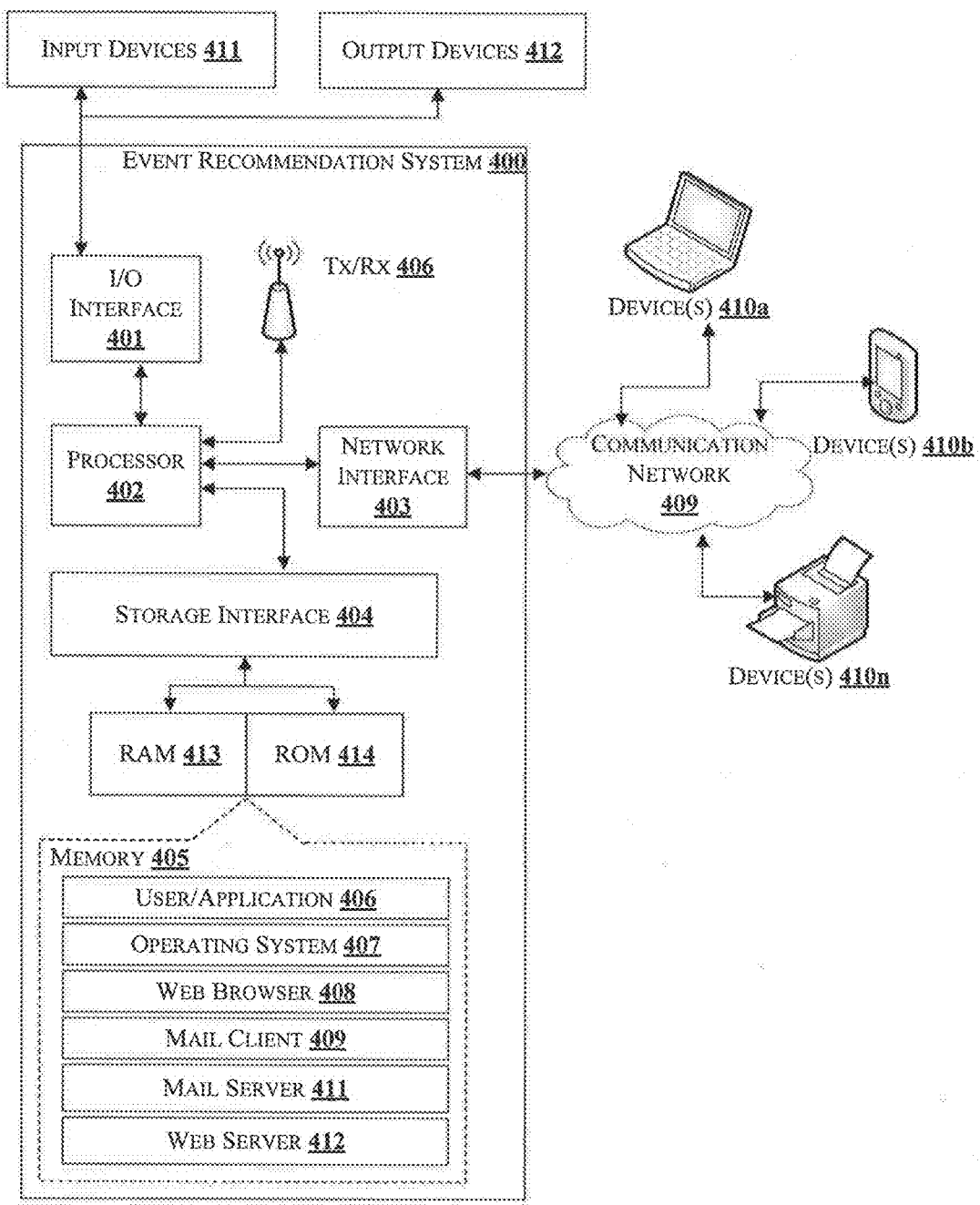
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 is used for recommending one or more events based on mood of a person using an event recommendation system 101. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . ,n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . ,n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Intertfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method to improve or increase the positive aspect of mood of a person in real-time by recommending one or more events which are of interest to the person.

In an embodiment, the present disclosure provides a method for determining mood of the person, pleased or depressed, and predict the influence of a current and/or one or more future events on the person.

In an embodiment, the present disclosure provides a method for analyzing severity of one or more events on the person and to provide a suitable psychological assistance for improving the mental health of the person.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Event recommendation system |
| 103 | Data sources |
| 105 | Communication network |
| 107 | Processor |
| 109 | Memory |
| 111 | I/O interface |
| 201 | Data |
| 202 | Modules |
| 203 | Activity data |
| 205 | Event profile |
| 207 | Activity score |
| 209 | Emotional quotient |
| 211 | Sensitivity score |
| 213 | Mood score |
| 215 | Other data |
| 217 | Receiving module |
| 219 | Classification module |
| 221 | Feature extraction module |
| 223 | Event profile generation module |
| 225 | Sensitivity scoring module |
| 227 | Mood scoring module |
| 229 | Event recommendation module |
| 231 | Other modules |

What is claimed is:

1. A method for recommending one or more events based on mood of a person, the method comprising:

receiving, by an I/O interface of an event recommendation system, activity data associated with one or more activities of the person and personal information of the person from one or more data sources through a communication network;

classifying, by the event recommendation system, the activity data into one or more predefined categories;

generating, by the event recommendation system, an event profile of the person based on the classified activity data;

determining, by the event recommendation system, a sensitivity score for the person based on impact of a current event on the person, activity score of the person and correlation of the current event with one or more events occurred simultaneously with the current event;

determining, by the event recommendation system, a mood score for the person based on the sensitivity score and the event profile of the person; and recommending, by the event recommendation system, one or more events to the person based on the sensitivity score and the mood score of the person.

2. The method as claimed in claim 1, wherein the activity data is classified into one or more predefined categories based on at least one of one or more interests of the person, health information of the person and information about one or more persons related to the person over a predetermined period of time.

3. The method as claimed in claim 1, wherein the event profile of the person includes one or more personal information of the person, one or more interests of the person, information about the one or more persons related to the person, impact of the one or more events on the person and reaction of the person towards the impact of the one or more events.

4. The method as claimed in claim 1, wherein the impact of the current event on the person is determined based on age of the person, relevance of the current event to the person and an emotional quotient of the person.

5. The method as claimed in claim 4, wherein the emotional quotient of the person is determined by monitoring behaviour of the person towards the one or more events occurred previously.

6. The method as claimed in claim 1, wherein the activity score is identified based on active condition of the person at predefined time intervals.

7. The method as claimed in claim 1, wherein the one or more events are recommended to the person based on the one or more interests of the person stored in the event profile of the person.

8. The method as claimed in claim 1, wherein the correlation of the current event with one or more events occurred simultaneously with the current event is indicated by a correlation factor having a value of 1 or −1.

9. The method as claimed in claim 1, the method further comprising dynamically updating, by the event recommendation system, the event profile of the person with respect to a change in the interest of the person.

10. The method as claimed in claim 1, the method further comprising extracting, by the event recommendation system, information from the one or more activity data,
wherein the information extracted is used for performing dimensionality reduction of the one or more activity data.

11. The method as claimed in claim 1, wherein the event recommendation system uses one or more of univariate feature selection, recursive feature elimination, randomized sparse models and deep Learning algorithm.

12. An event recommendation system for recommending one or more events based on mood of a person, the event recommendation system comprising:
 a processor; and
 a memory communicatively coupled to the processor, wherein the memory stores processor-executable instructions, which, on execution, causes the processor to:
  receive activity data associated with one or more activities of the person and personal information of the person from one or more data sources;
  classify the activity data into one or more predefined categories;
  generate an event profile of the person based on the classified activity data;
  determine a sensitivity score for the person based on impact of a current event on the person, activity score of the person and correlation of the current event with one or more events occurred simultaneously with the current event;
  determine a mood score for the person based on the sensitivity score and the event profile of the person; and
  recommend one or more events to the person based on the sensitivity score and the mood score of the person.

13. The system as claimed in claim 12, wherein the instructions cause the processor to classify the activity data into the one or more predefined categories based on at least one of one or more interests of the person, health information of the person and information about one or more persons related to the person over a predetermined period of time.

14. The system as claimed in claim 12, wherein the event profile of the person includes one or more personal information of the person, one or more interests of the person, information about the one or more persons related to the person, impact of the one or more events on the person and reaction of the person towards the impact of the one or more events.

15. The system as claimed in claim 12, wherein the instructions cause the processor to determine the impact of the current event on the person based on age of the person, relevance of the current event to the person and an emotional quotient of the person.

16. The system as claimed in claim 15, wherein the instructions cause the processor to determine the emotional quotient of the person by monitoring behaviour of the person towards the one or more events occurred previously.

17. The system as claimed in claim 12, wherein the instructions cause the processor to identify the activity score based on active condition of the person at predefined time intervals.

18. The system as claimed in claim 12, wherein the processor recommends the one or more events to the person based on the one or more interests of the person stored in the event profile of the person.

19. A non-transitory computer readable medium including instructions stored thereon that when processed by at least one processor cause an event recommendation system to perform operations comprising:
 receiving activity data associated with one or more activities of the person and personal information of the person from one or more data sources;
 classifying the activity data into one or more predefined categories;
 generating an event profile of the person based on the classified activity data;
 determining a sensitivity score for the person based on impact of a current event on the person, activity score of the person and correlation of the current event with one or more events occurred simultaneously with the current event;
 determining a mood score for the person based on the sensitivity score and the event profile of the person; and
 recommending one or more events to the person based on the sensitivity score and the mood score of the person.

* * * * *